United States Patent
Perlo et al.

(10) Patent No.: US 11,945,610 B2
(45) Date of Patent: Apr. 2, 2024

(54) AIRCRAFT, IN PARTICULAR A DRONE OR AN AIRCRAFT FOR PERSONAL AIR MOBILITY, WITH HIGH EFFICIENCY PROPELLER ROTORS

(71) Applicant: INTERACTIVE FULLY ELECTRICAL VEHICLES S.R.L., La Loggia (IT)

(72) Inventors: Pietro Perlo, La Loggia (IT); Davide Penserini, La Loggia (IT)

(73) Assignee: INTERACTIVE FULLY ELECTRICAL VEHICLES S.R.L., La Loggia (IT)

( * ) Notice: Subject to any disclaimer, the term of this patent is extended or adjusted under 35 U.S.C. 154(b) by 133 days.

(21) Appl. No.: 17/596,993

(22) PCT Filed: Jun. 23, 2020

(86) PCT No.: PCT/IB2020/055898
§ 371 (c)(1),
(2) Date: Dec. 22, 2021

(87) PCT Pub. No.: WO2020/261102
PCT Pub. Date: Dec. 30, 2020

(65) Prior Publication Data
US 2022/0242562 A1 Aug. 4, 2022

(30) Foreign Application Priority Data
Jun. 25, 2019 (IT) ........................ 102019000010008

(51) Int. Cl.
*B64U 10/14* (2023.01)
*B64C 11/00* (2006.01)
(Continued)

(52) U.S. Cl.
CPC ............ *B64U 10/14* (2023.01); *B64C 11/001* (2013.01); *B64C 29/0025* (2013.01);
(Continued)

(58) Field of Classification Search
CPC ............ B64C 29/0025; B64C 29/0016; B64C 11/001; B64C 27/20; B64C 27/16; B64U 30/27; F04D 29/326
See application file for complete search history.

(56) References Cited

U.S. PATENT DOCUMENTS 3,997,131 A * 12/1976 Kling ...................... B64C 27/10
416/129
2006/0049304 A1  3/2006 Sanders et al.
(Continued)

FOREIGN PATENT DOCUMENTS

EP  1 524 189 A1  4/2005
EP  3 290 334 A1  3/2018
(Continued)

OTHER PUBLICATIONS

International Search Report and Written Opinion of International Application No. PCT/IB2020/055898, dated Oct. 7, 2020, 14 pages.

*Primary Examiner* — Richard Green
*Assistant Examiner* — Arfan Y. Sinaki
(74) *Attorney, Agent, or Firm* — Heslin Rothenberg Farley & Mesiti P.C.; Victor A. Cardona, Esq.

(57) ABSTRACT

A drone or an aircraft for personal air mobility includes at least one horizontal planar structure having four ducted propeller rotors with vertical axis, which are substantially coplanar with each other. Each of the rotors has a rotating ring rotatably mounted within a circular opening. The rotating ring is configured as to define an annular wall for ducting of air flow produced by the rotor. Each of the rotors has one or more blades which extend towards the central axis of the rotor, and have tips terminating at a distance from the axis of the propeller, such that each rotor is an annular propeller. The rotating ring of each rotor is controlled by an actuator.

6 Claims, 20 Drawing Sheets

(51) Int. Cl.
    *B64C 29/00*     (2006.01)
    *B64D 27/24*     (2006.01)
    *B64U 10/13*     (2023.01)
    *B64U 10/20*     (2023.01)
    *B64U 30/27*     (2023.01)
    *B64U 50/19*     (2023.01)
    *H02K 21/24*     (2006.01)

(52) U.S. Cl.
    CPC .............. *B64D 27/24* (2013.01); *B64U 10/20* (2023.01); *B64U 30/27* (2023.01); *H02K 21/24* (2013.01); *B64U 10/13* (2023.01); *B64U 50/19* (2023.01)

(56) References Cited

U.S. PATENT DOCUMENTS

| | | | |
|---|---|---|---|
| 2007/0018037 A1 | 1/2007 | Perlo et al. | |
| 2016/0152327 A1* | 6/2016 | Bertels | F04D 29/522 415/121.3 |
| 2018/0200642 A1 | 7/2018 | Warren | |
| 2019/0028133 A1 | 1/2019 | Stroppiana | |
| 2021/0323688 A1* | 10/2021 | Yajima | B64D 33/04 |
| 2022/0185452 A1* | 6/2022 | Saber | B64D 27/24 |

FOREIGN PATENT DOCUMENTS

| | | | | |
|---|---|---|---|---|
| EP | 3290334 A1 * | 3/2018 | ........... | B64C 11/001 |
| WO | WO-2009153124 A2 * | 12/2009 | ............... | B63H 1/16 |

\* cited by examiner

AIRCRAFT, IN PARTICULAR A DRONE OR AN AIRCRAFT FOR PERSONAL AIR MOBILITY, WITH HIGH EFFICIENCY PROPELLER ROTORS

CROSS REFERENCE TO RELATED APPLICATIONS

This application is a national stage filing under section 371 of International Application No. PCT/IB2020/055898, filed on Jun. 23, 2020, published in English on Dec. 30, 2021 as WO 2020/261102 and which claims priority to Italian Patent Application No. 102019000010008 filed on Jun. 25, 2019, the entire disclosure of these applications being hereby incorporated herein by reference.

FIELD OF THE INVENTION

The present invention relates to aircrafts, in particular to aircrafts which can be used as drones or aircrafts for personal air mobility.

PRIOR ART

In recent years, various types of drones and small aircrafts for personal air mobility have been proposed. A common drawback in the solutions that have appeared to date lies in the relatively reduced flight range, in the poor efficiency of the propeller rotors and in the constructive complication of the motor systems for driving the rotors.

Pietro Perlo, one of the present inventors, has worked for several years on studies and investigations aimed at achieving high efficiency propeller rotors. For example, the document EP 1 524 189 A1 relates to a micro-aircraft that can be associated with a mobile phone and comprising a substantially planar structure in which four ducted propeller rotors with vertical axis are incorporated, which are substantially coplanar with each other. Each of the four propeller rotors comprises a rotating ring rotatably mounted within a cylindrical opening with a vertical axis, formed through the planar structure, and defines a duct for the air flow generated by the rotor. Each of the four rotors comprises at least one blade, which extends radially from the body of the rotating ring towards the central axis of the rotor. The known solution described above was developed for an aircraft of microscopic dimensions and, therefore, did not involve the solution of the far more significant problems encountered in the case of a self-driving drone, intended, for example, for transporting loads (for example, for delivering parcels), or an aircraft for personal air mobility.

One problem that is difficult to solve is, in particular, identifying motor means that guarantee the necessary power and torque characteristics, also safeguarding the need for a maximum torque/weight ratio and minimum energy consumption. Various types of motors were envisaged in the aforesaid document, including annular electric motors, without, however, offering an optimal solution in this regard.

Furthermore, as mentioned, the aforesaid known solution was far from offering solutions for the application of propeller rotors of the type indicated above to aircraft such as drones capable of carrying a load or aircraft for personal air mobility.

OBJECT OF THE INVENTION

The object of the invention is to overcome the drawbacks of the prior art by producing an aircraft which can be used—in particular—as a remote-controlled or self-driven drone, or as an aircraft for personal air mobility, equipped with high-efficiency propeller rotors, with a high torque/weight ratio, high speed rotation capability and minimum energy consumption.

An additional object of the invention is to achieve the aforesaid purpose with an aircraft having a structure which is extremely simple in construction, with a very low weight and yet extremely stable and controllable in flight and capable of high vertical thrust.

SUMMARY OF THE INVENTION

In order to achieve these and additional objects, the invention relates to an aircraft, in particular a drone or an aircraft for personal air mobility, comprising at least one horizontal planar structure, in which several ducted propeller rotors with vertical axis are incorporated, wherein each of the propeller rotors comprises a rotating ring rotatably mounted within a circular opening with a vertical axis, formed through said at least one horizontal planar structure, said rotating ring being configured in such a way as to define an annular wall for ducting the air flow produced from the propeller rotor, wherein each of the propeller rotors also comprises one or more blades which extend radially from the body of the rotating ring towards the central axis of the propeller rotor, and which have their tips terminating at a distance from the central axis of the propeller rotor, in such a way that each propeller rotor is in the form of an annular propeller, and wherein the rotating ring of each propeller rotor is controlled in rotation by an electric actuator consisting of an axial flow annular electric motor or a piezoelectric annular motor, comprising a system of piezoelectric actuators.

In the case in which the rotating ring of each propeller rotor is controlled in rotation by an axial flow annular electric motor, a first solution provides two stator elements in the form of annular discs carried by said structure of the aircraft, between which a rotor element is axially interposed in the form of an annular disc connected to said rotating ring of the propeller rotor. In a second solution, a single stator element is provided in the form of an annular disc carried by said structure of the aircraft, and axially interposed between two rotor elements in the form of annular discs, which are connected to said rotating ring by the propeller rotor. In the case of the latter embodiment, it may be envisaged that the two rotor elements are connected to each other by a circumferential wall arranged concentrically inside the stator element, in such a way that the set of the two rotor elements has a C-shaped cross-section. In this embodiment, it can also be envisaged that the cross-section of the annular disc defining the stator element has a T-shape on the radially inner side of the stator annular disc, so as to define two circumferential protrusions that are received within two corresponding circumferential cavities formed in the two rotor elements.

In the case in which the rotating ring of each propeller rotor is controlled in rotation by a system of piezoelectric actuators, each piezoelectric actuator includes at least one piezoelectric foil configured to engage a peripheral side surface of the rotating ring so as to impart a thrust thereto in a tangential direction with respect to the center of the rotor. Piezoelectric actuators of this type are known in the art. For the purposes of the present invention, for example, piezoelectric actuators (piezoelectric motors) produced by the company Nanomotion LTD can be used.

In the event that the aircraft according to the invention is configured as a drone, it comprises a horizontal planar structure in which the four propeller rotors are incorporated. In a preferred embodiment of the drone, the drone has a wing-shaped superstructure, supported above and at a distance from the planar structure in which the four propeller rotors are incorporated. Preferably, said wing superstructure also supports a fifth horizontal tail propeller rotor, having the same configuration described above for the four vertical axis propeller rotors. The drone may also be devoid of the aforesaid wing superstructure, but—in any case—be equipped with the aforesaid fifth horizontal axis propeller rotor, which—in this case—is supported by the same structure in which the four vertical axis propeller rotors are incorporated.

If the aircraft is configured to be used for personal air mobility, the four vertical axis propeller rotors are incorporated, respectively, into two horizontal front planes, preferably part of a single front wing, and in two horizontal tail planes, said front horizontal planes and said tail planes being carried by a central cell including a passenger compartment and carrying a fifth horizontal axis tail propeller rotor, configured in a similar way to the four vertical axis rotors.

Also in the case of an aircraft for personal air mobility, a wing-shaped superstructure is preferably provided, carried above the cell. In this case as well, as in the case of a drone, the wing superstructure, if provided, can also be equipped with a distribution of photovoltaic solar cells.

As can be seen, an important concept of the preferred embodiments of the invention resides in integrating annular propellers within one or more wing surfaces, in order to increase the vertical thrust. A further important concept consists in providing an additional upper bearing wing overlapped and spaced apart with respect to the plane of the annular propellers.

DETAILED DESCRIPTION OF THE INVENTION

Further characteristics and advantages of the invention will become apparent from the description that follows with reference to the attached drawings, provided purely by way of non-limiting example, wherein:

FIG. 1 is a partially cross-sectioned perspective view of a first embodiment of a drone according to the present invention, using annular propellers operated by piezoelectric motors, FIG. 2 is a cross-sectional view in a vertical plane of one of the propeller rotors of the drone of FIG. 1, in a variant in which each annular propeller is driven by an axial flow annular electric motor, of the type with a single rotor disc axially interposed between two stator discs, FIG. 3 is a cross-sectioned perspective view of the propeller rotor of FIG. 2, FIG. 4 shows a view corresponding to that of FIG. 3, in the case of an additional embodiment in which each annular propeller is driven by an axial flow annular electric motor, of the type with a single stator disc axially interposed between two rotor discs, which are connected to each other, FIGS. 5 and 6 are perspective views of additional embodiments of annular propellers usable in embodiments of the invention, FIG. 7 illustrates an overall perspective view of an additional embodiment of a drone according to an additional embodiment of the invention, in which a wing is associated with four annular propellers that provide vertical thrust, to improve the efficiency in horizontal motion provided mainly by an annular tail propeller, FIGS. 8 and 9 are a plan view and a rear view of the drone of FIG. 5, FIGS. 10 and 11 are a perspective view and a plan view of an additional embodiment of the drone according to the invention, in which the four annular propellers for vertical thrust are integrated into a single wing, FIG. 12 is a side view of the solution of FIGS. 10 and 11, which shows the profile of the wing, which can also be used for the upper wing in the embodiment of FIGS. 8 and 9, FIGS. 13 and 14 are two perspective views of an aircraft for personal air mobility, made in accordance with the disclosures of the present invention, FIGS. 15A-15E and 16A, 16B are schematic views of examples of axial flow annular electric motors, usable in the aircraft of the present invention, and FIGS. 17-20 illustrate further schematic cross-sectional views of examples of annular electric motors with mixed axial and radial flow, which also can be used in the aircraft of the present invention.

In FIG. 1, the numeral 1 indicates—in its entirety—a drone (for example of the radio-controlled or remote-controlled or self-driving type), usable for various purposes, such as, for example, the aerial recognition of agricultural fields, or the transport of a payload, for example, for deliveries of packages.

The drone 1 comprises a single horizontal planar structure of very limited thickness, indicated—in its entirety—by 2, defining a hollow body, quadrangular in shape, with an upper main surface 2A, a lower surface 2B, and four side surfaces 2C, two of which are visible in FIG. 1.

The structure 2 incorporates four ducted propeller rotors 3, with a vertical axis, substantially coplanar with each other, equipped with annular propellers. Each of the four propeller rotors 3 comprises a substantially tubular rotating ring 4, which defines an annular wall for ducting of the air flow generated by the rotor. The ring 4 is rotatably mounted within an opening 5 formed through the structure 2 and defined by a cylindrical wall 6.

Each of the four propeller rotors 3 also comprises one or more blades 7 which have their tips that end at a distance from the central axis of the rotor, so that the rotor defines an annular propeller. In the illustrated example, each annular propeller 3 is equipped with three blades 7. Each blade 7 extends radially from the body of the rotating ring 4 towards the central axis of the rotor 3. In the example illustrated in FIG. 1, each blade 7 has a substantially flat shape, and has an attachment root, connected to the rotating ring 4 oriented in a direction inclined by a predetermined angle with respect to a plane perpendicular to the axis of the rotor. Of course, the blade 7 could have a different shape from the flat shape, and—in particular—it could have a twisted shape with its cross-section oriented in a direction that is progressively rotated from the root to the tip of the blade (see FIGS. 16, 17, illustrated below).

The angle of inclination of the attachment root of each blade 7 is predetermined according to the required performance for the rotor.

In the case of the embodiment illustrated in FIG. 1, the rotation of the rotating rings 4 of the four rotors 3 is controlled by a "piezoelectric motor" comprising a plurality of piezoelectric actuators 8 comprising piezoelectric foils 9, which are engaged against the side surface of the respective rotating ring 4. When they are electrically powered, the piezoelectric foils 9 perform a movement that imparts a thrust in the tangential direction (with respect to the central axis of the rotor) to the side surface of the rotating ring 4. In the illustrated example, three pairs of electric actuators of the type indicated above are arranged at 120° from each other. Solutions of piezoelectric motors of this type, with multiple piezoelectric actuators arranged around a rotor and configured to impart the rotation movement to the rotor itself, are known per se in the art. For example, piezoelectric motors of this type are produced and marketed by the company Nanomotion, LTD., of the Johnson Electric group.

FIG. 2 illustrates a cross-section of the drone rotor of FIG. 1, in a configuration in which the drone is intended for transporting a payload, for example, for transporting postal packages. In this case, instead of piezoelectric motors, axial flow electric motors are used to control the rotation of the annular propellers of the propeller rotors. In this case, the axial flow electric motor is in the form of an annular motor arranged concentrically around the rotating ring 4 of each annular propeller. The axial flow electric motor, indicated— in its entirety—by the reference 10, comprises two stator elements 12, in the form of annular discs with a quadrangular cross-section between which an annular disc 11 is axially interposed, acting as a rotor element. The rotor disc 11 is connected in rotation with the rotating ring 4 of the propeller rotor 3 by means of respective teeth 4A, 11A (see FIG. 3) which are in mutual engagement. The two stator discs 12 are instead carried by the structure 2 of the drone.

FIG. 4 illustrates a variant in which the rotating ring 4 of the propeller rotor 3 is driven in rotation by an axial flow annular electric motor with a single stator annular disc 12 interposed axially between two rotor annular discs 11, which are connected to each other by a circumferential wall 11B, which is arranged concentrically within the stator annular disc 12. The circumferential wall 11B that joins together the two rotor annular discs 11 is rigidly connected in rotation with the ring 4 by means of the teeth 4A, 11A in mutual engagement with each other.

In a variant of FIG. 4, the stator annular disc 12 has a cross-section which has a T-shape on the radially inner side of the annular disc 12, so as to define two circumferential protrusions 11E (indicated with a dashed line in FIG. 4), which are received within corresponding circumferential cavities of the two rotor discs 11.

In the case in which the horizontal motion is determined only by the ducted rotors with vertical axis, as in the additional embodiment examples illustrated in FIGS. 5 and 6, preferably the blades 7 can emerge axially from the annular wall 4 and from the circular opening 5 which contains it. This ensures greater efficiency of the blades in horizontal motion, since a small attachment angle of the root of the blades is sufficient to ensure a thrust in the required direction. In the embodiment of FIG. 6, the annular wall 4 on which the blades 7 are attached is partially excavated with recesses 40. These recesses are intended to prevent a part of the air pushed down by the blades 7 from hitting the wall 4 before exiting the ducted rotor system.

FIGS. 7-9 illustrate an additional embodiment of the drone 1, in which the structure 2 has a large central opening defined between four arms 14, which join together the stationary rings of the four rotors 3. In the example of FIG. 5, the structure 2 includes a wing-shaped superstructure 20, having an aerodynamic profile such as to generate a lift force. The wing superstructure 20 is parallelly supported at a distance above the structure 2 by means of vertical uprights 21. The structure 2 and the superstructure 20 also support a horizontal axis tail rotor 30, configured in the same way as described with reference to the vertical axis rotors 3. The tail rotor 30 has a stationary ring 30A which is included in a vertical upright 30B having a lower end connected to the structure 2 and the upper end connected to a tail beam 30C projecting cantilevered from the wing superstructure 20. The reduced thickness of the motors and the propeller rotors allows the same structure that contains the four vertical axis rotors to be preferably shaped as a bearing wing.

In the illustrated example, the upper surface of the wing structure 20 bears a distribution of photovoltaic cells 22.

Of course, the drone according to the invention is equipped, according to a technique known per se, with one or more electronic controllers for controlling the drive motors of the rotors and for the diversified actuation of the rotation of these rotors in order to obtain the required directional maneuvers. The orientation of the drone can be defined by acting on the rotation speed of the vertical axis propeller rotors. If an additional horizontal axis propeller is used, the direction of motion can also be defined by a flap placed on the same horizontal axis propeller. The drone is also, of course, equipped with one or more rechargeable electric batteries, as well as localization units of the GPS type or of the optical flow type, according to known methods; with a vision unit of the fixed camera type or of the gimbal type with a band or more vision bands in the visible or infrared; with a wireless communication unit and/or any necessary sensor device or instrument in order to allow the control of the flight of the drone by a ground control station or according to any predetermined flight program, with which the on-board electronic controller is programmed. To this end, the drone can, of course, be equipped, according to techniques known per se, with other forms of geo-localization systems.

All the details relating to these aspects are not described or illustrated here, because, as indicated, they are achievable in any known way, and in that their elimination from the drawings makes the drawings more readily and easily understood.

FIGS. 10 and 11 illustrate a variant wherein the drone 1 does not have the superstructure 20 illustrated in FIGS. 7-9, but is in any case equipped with two tail beams 30C, an upper and a lower one, which support the stationary ring 30A of the tail rotor 30.

In this case, a distribution of photovoltaic cells 22 is arranged above the upper surface of the structure 2.

Figure 1:
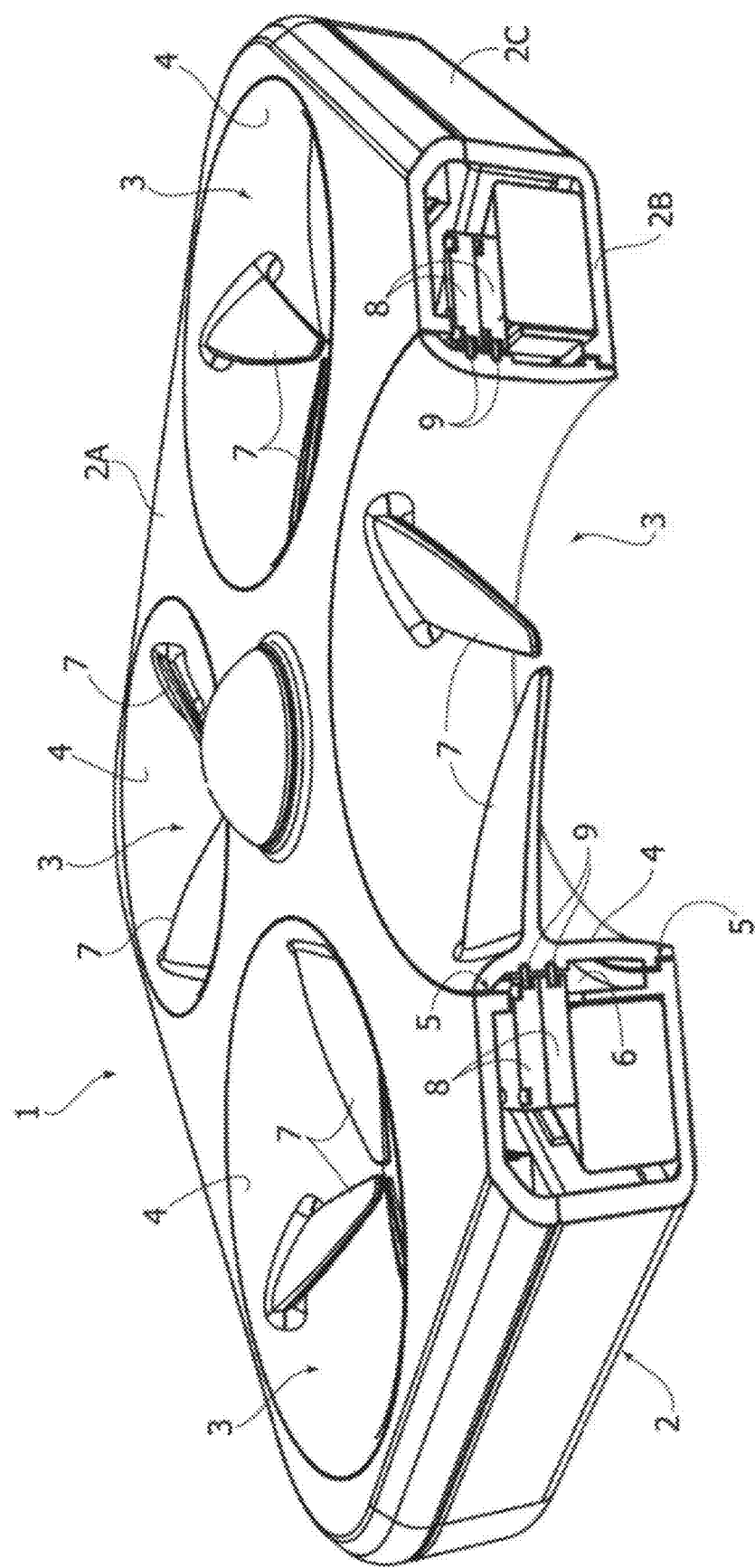
Figure 2:
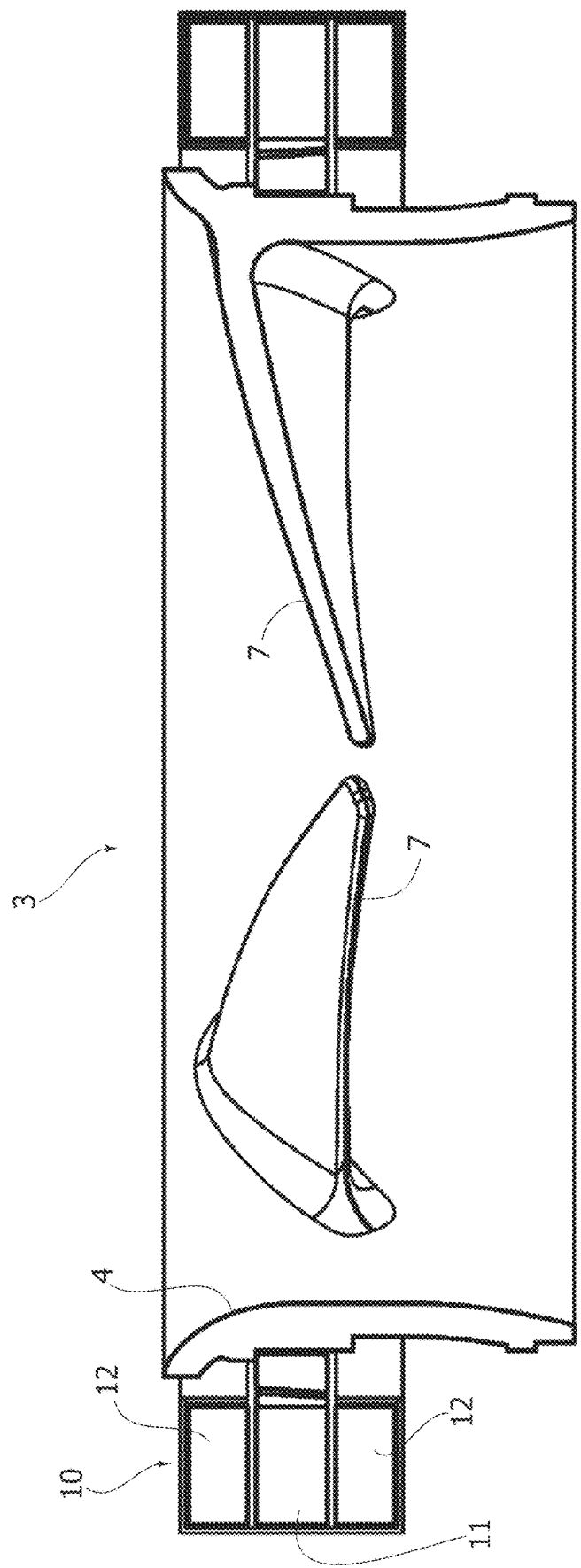
Figure 3:
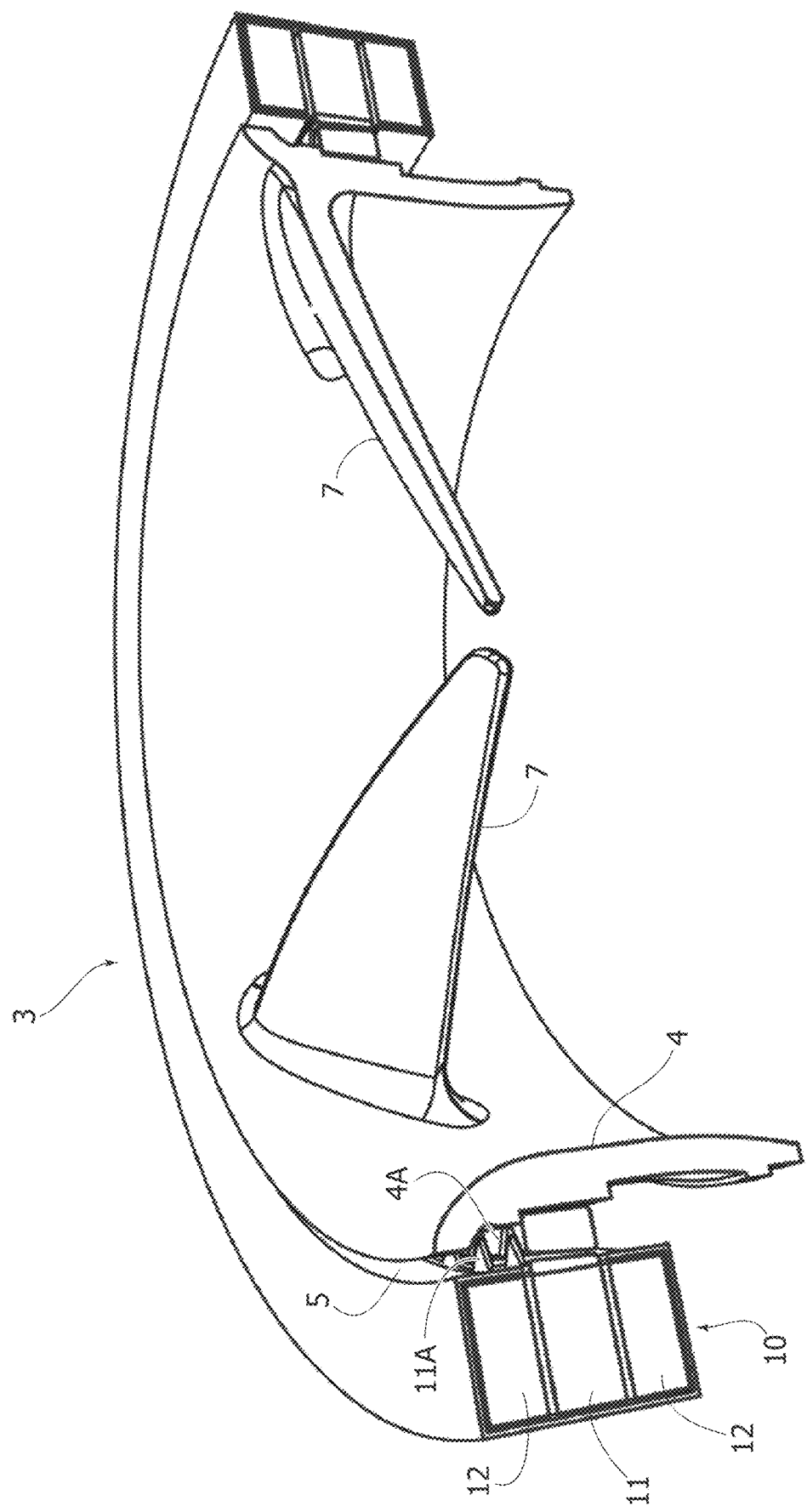
Figure 4:
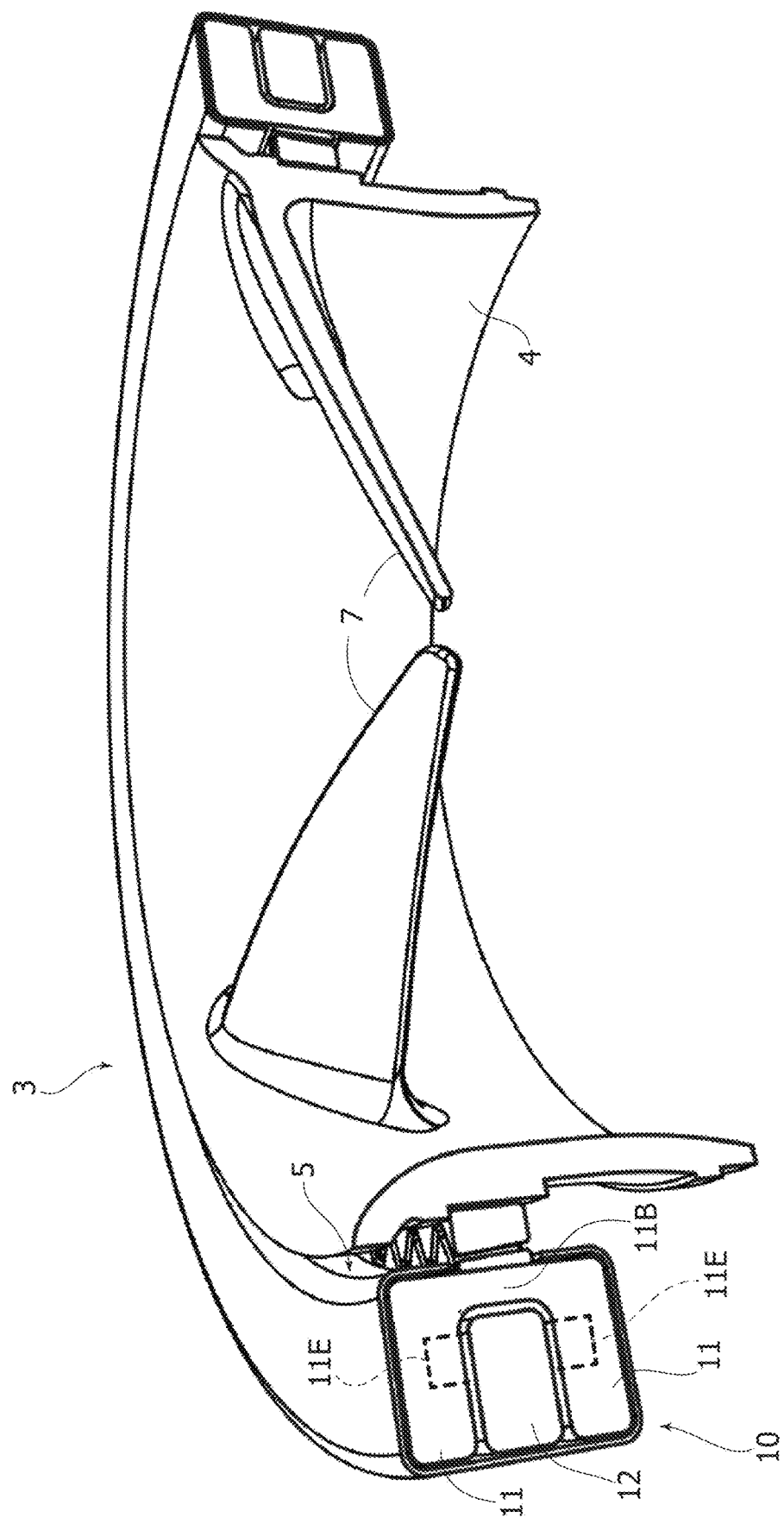
Figure 5:
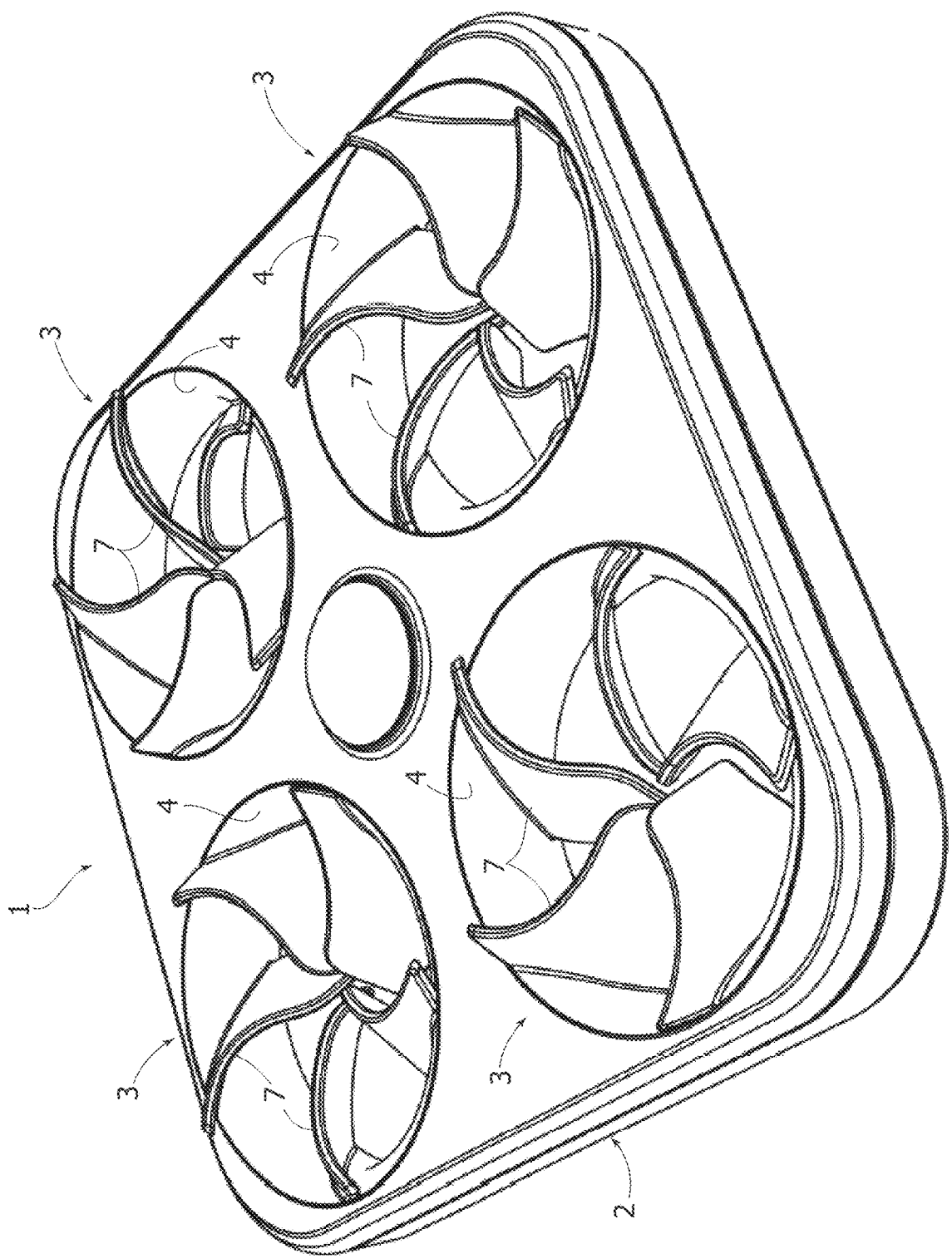
Figure 6:
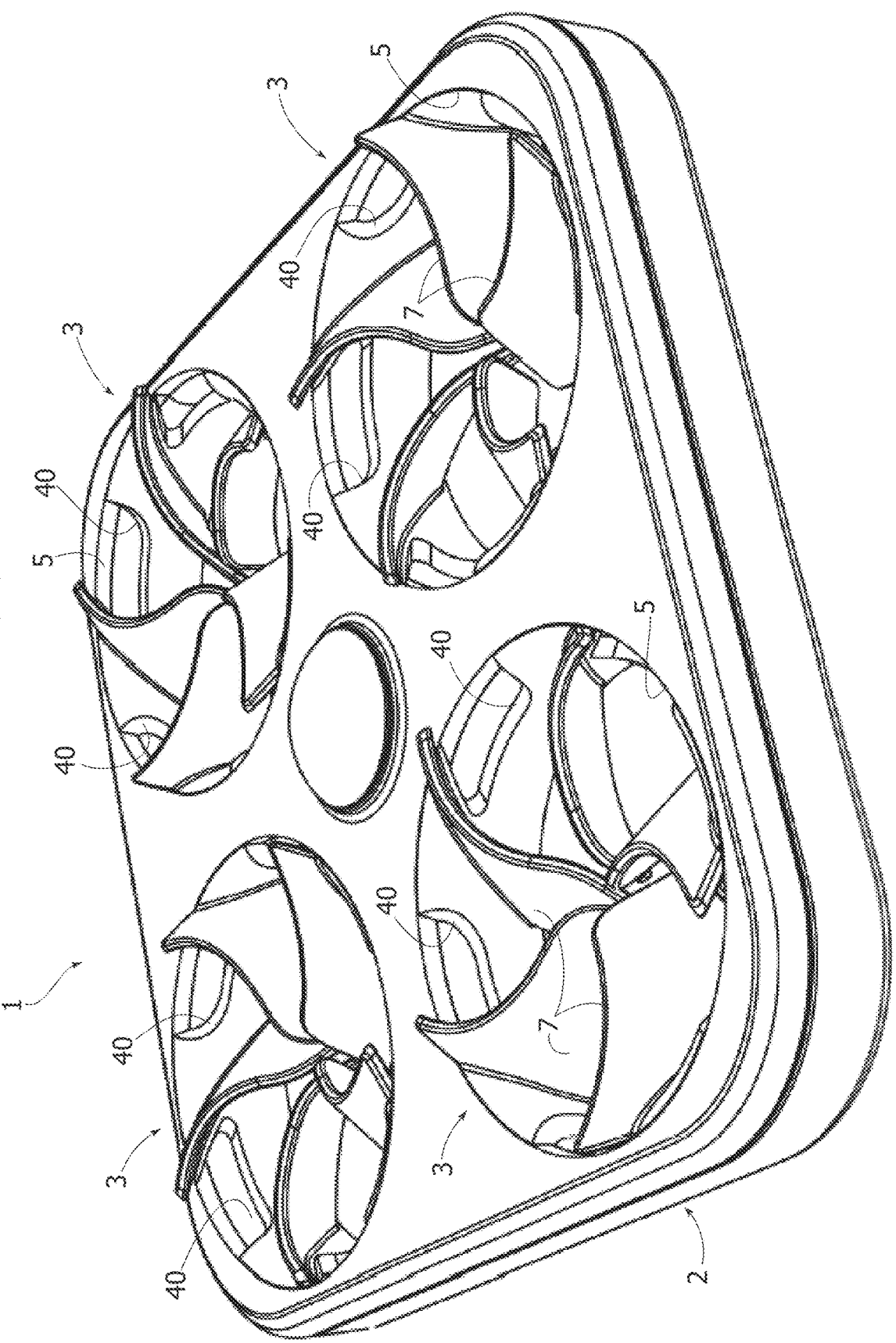
Figure 7:
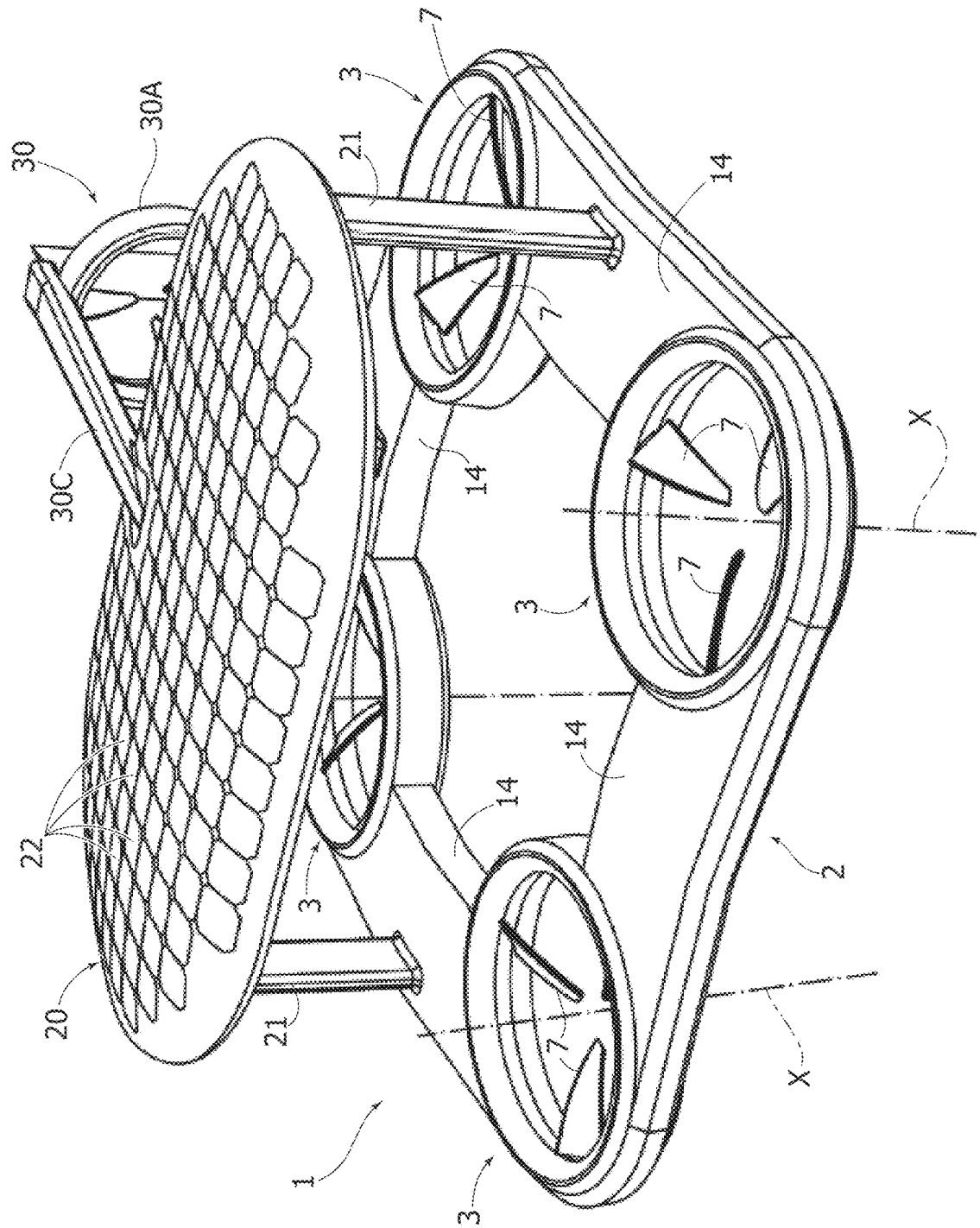
Figure 8:
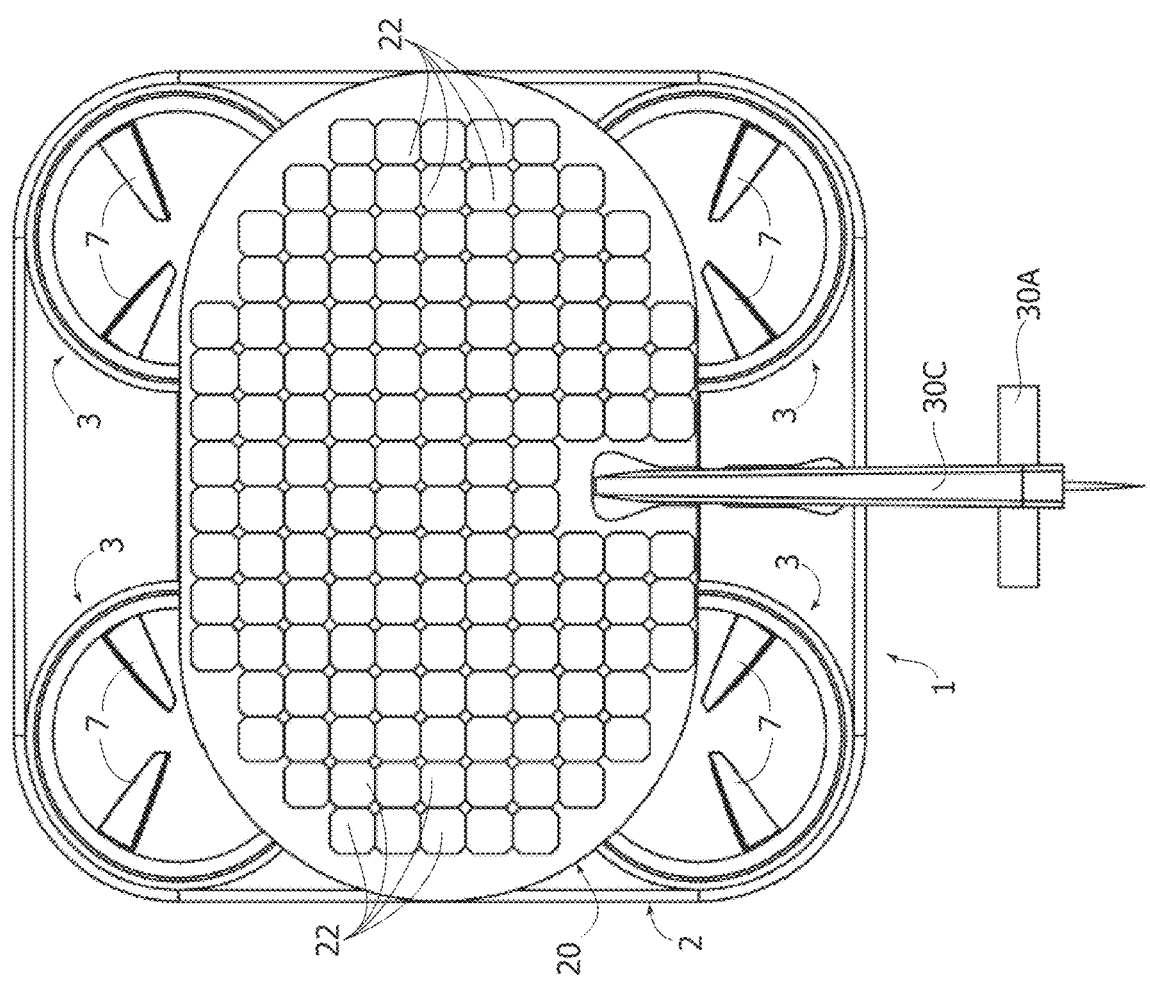
Figure 9:
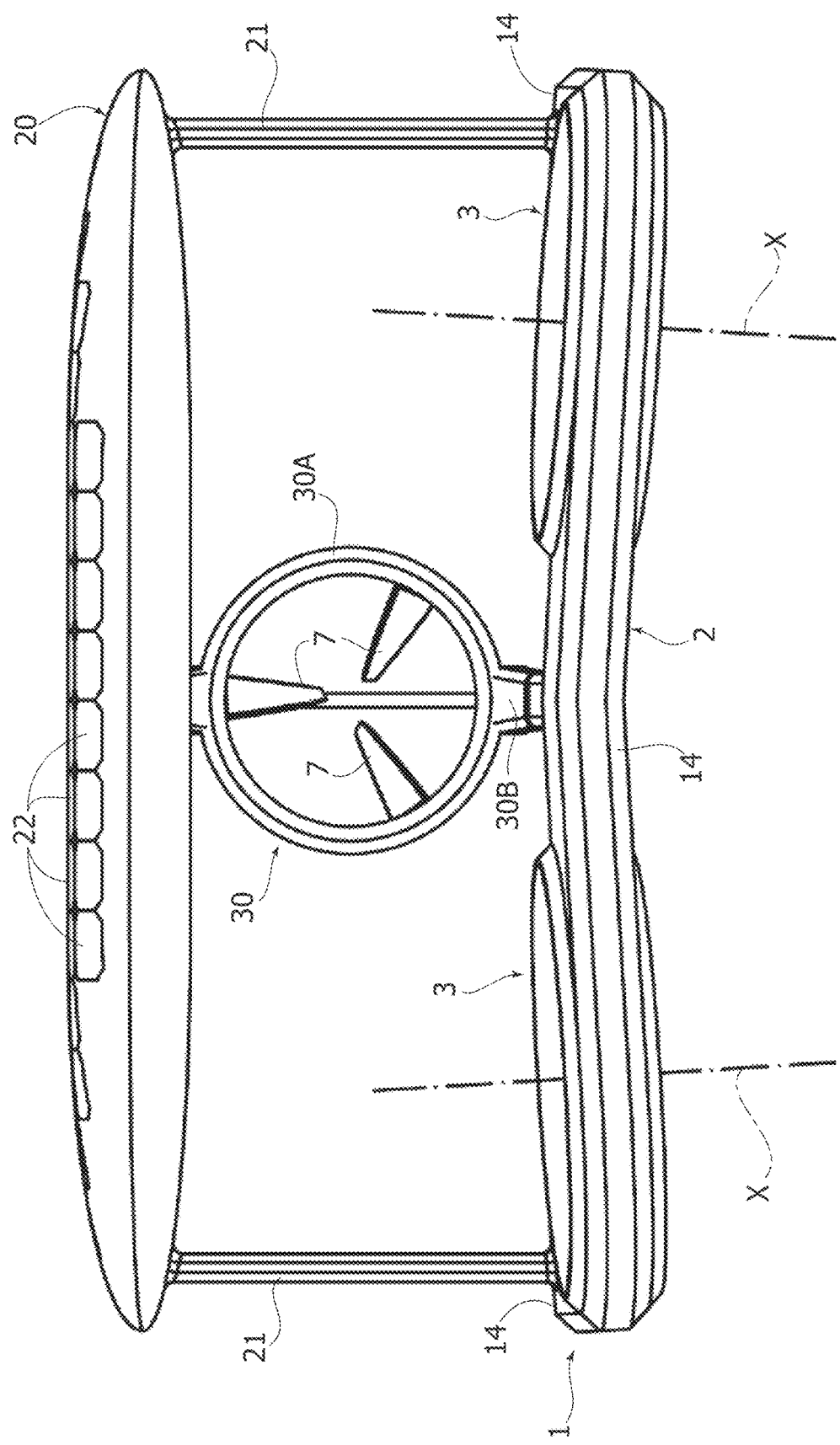
Figure 10:
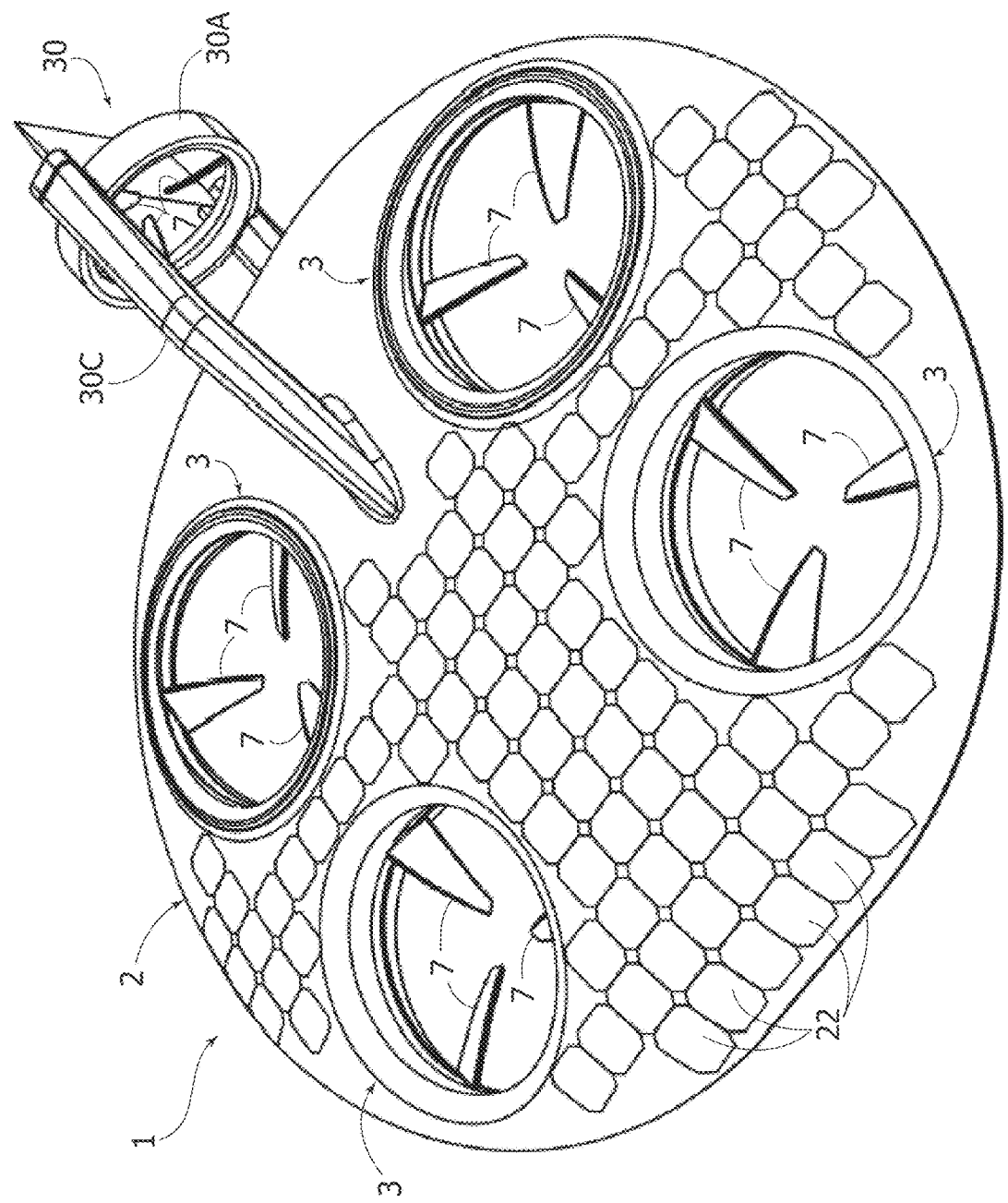
Figure 11:
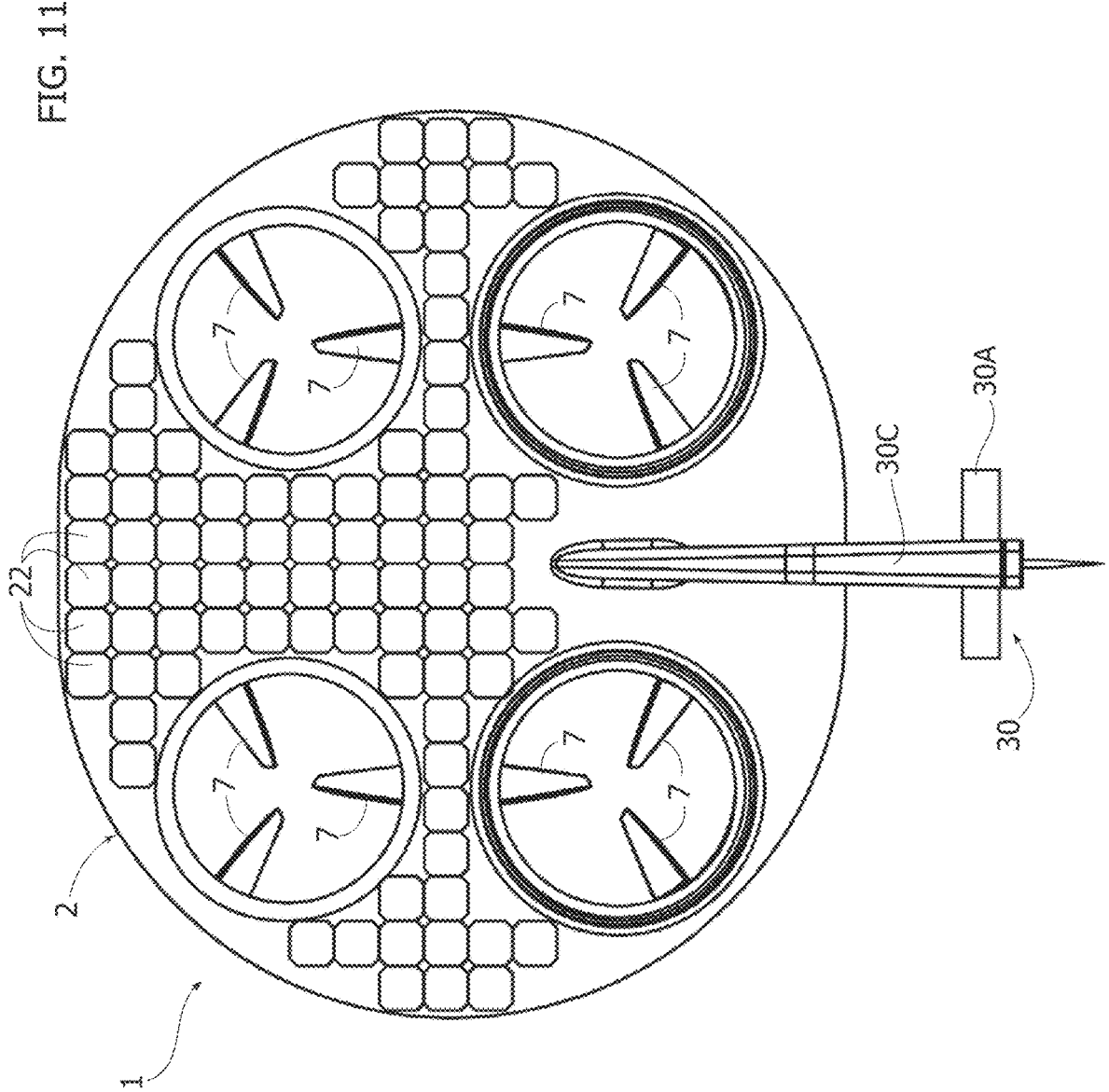
Figure 12:
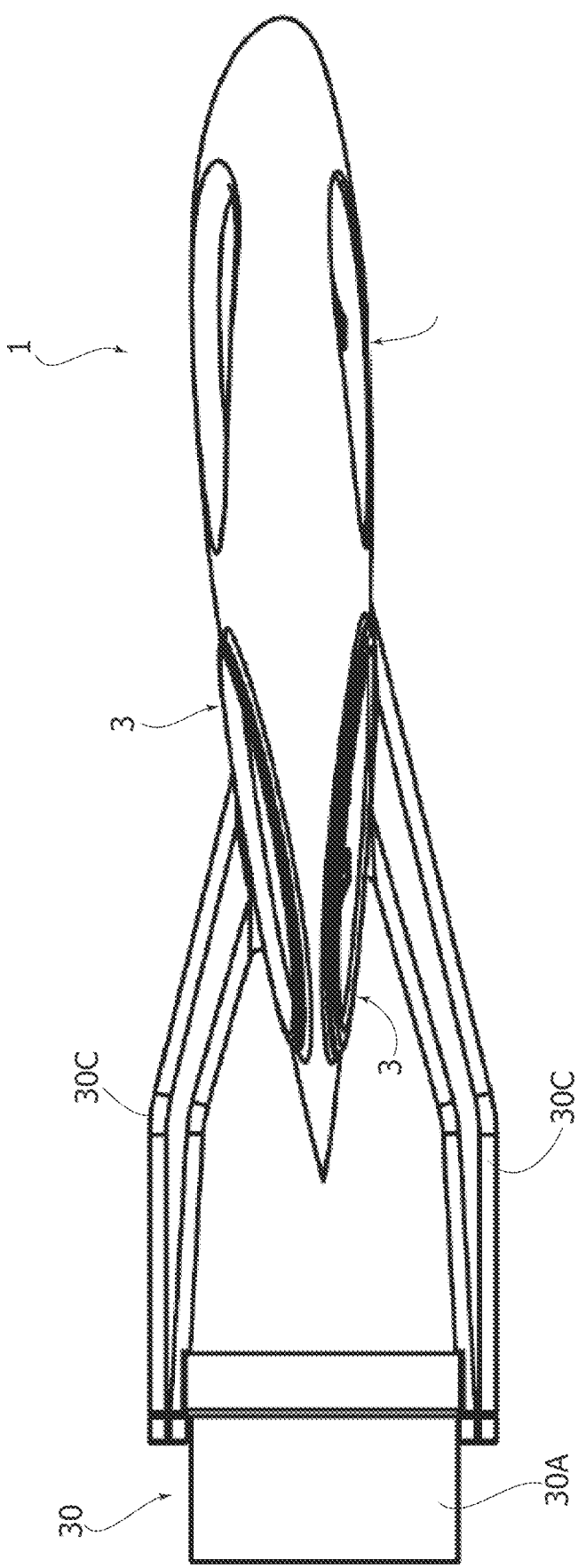
FIG. 12 is a side view of the solution of FIGS. 10 and 11, which shows the profile of the wing, which can also be used for the upper wing in the embodiment of FIGS. 8 and 9.
Figure 13:
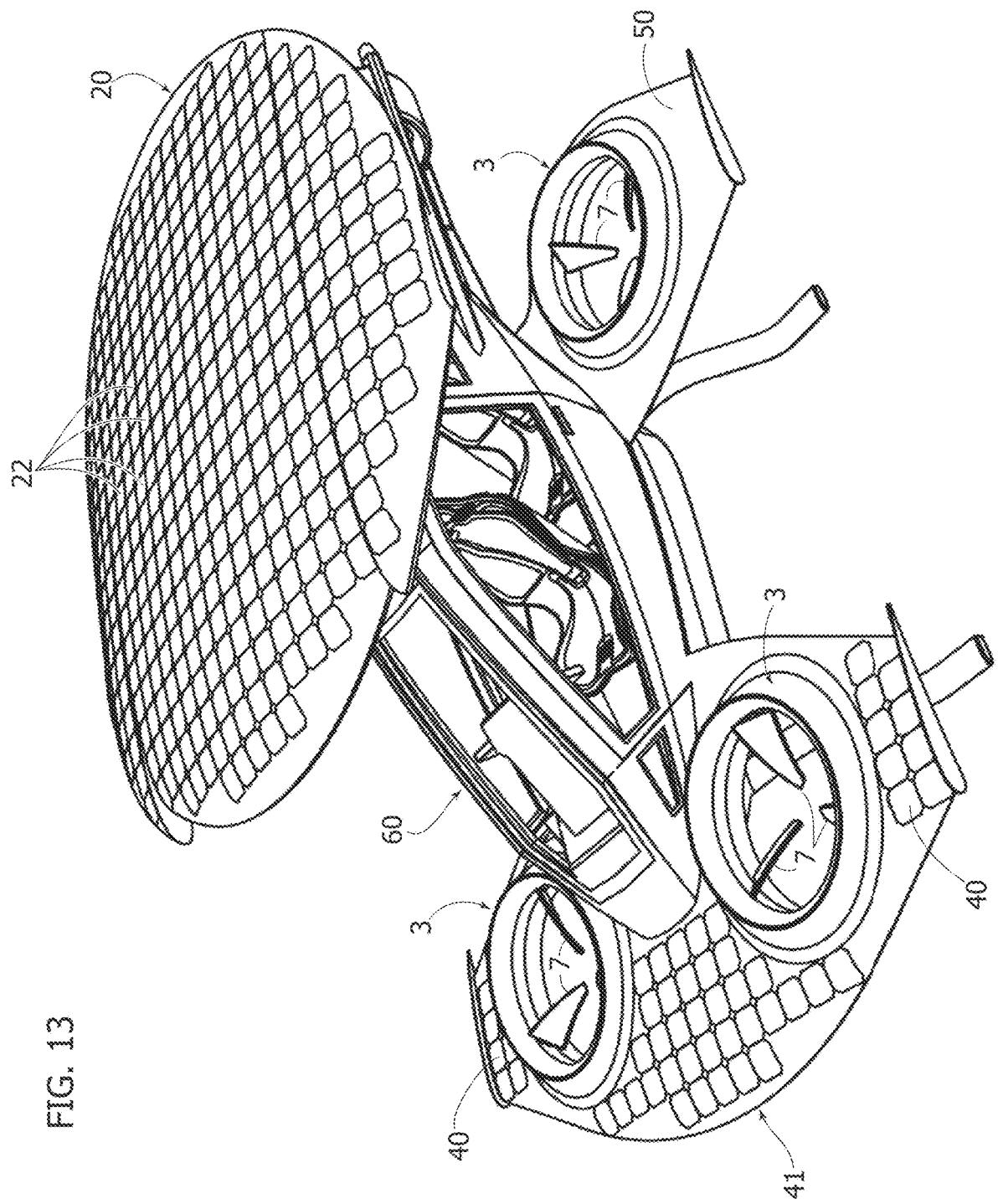
FIGS. 13 and 14 illustrate an embodiment wherein the aircraft 1 is configured as an aircraft for personal air mobility. The example refers to the case of an aircraft for one pilot and one passenger, or two passengers, in the case of self-driving aircraft.
Figure 14:
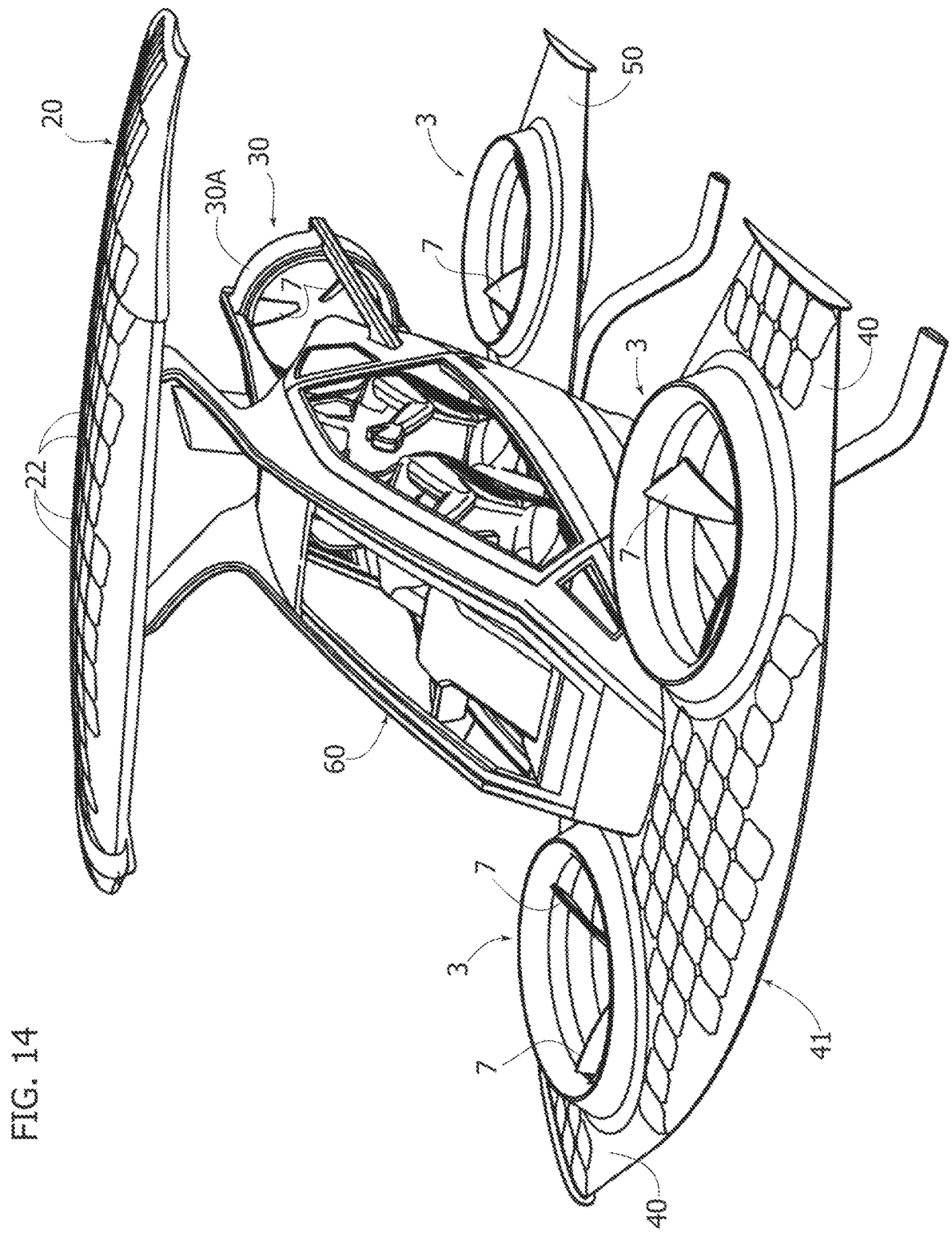

In this case the rotors 3, which have the same configuration described with reference to FIG. 1, are incorporated in two frontal tail planes 40 which, in the illustrated example, form part of a single front wing 41, and in two horizontal tail planes 50 (only one of which is visible in the figures).

The front wing 41 and the horizontal tail planes 50 are carried by a central cell 60 including the passenger compartment, with two aligned seats, one for the pilot seat and the other for a passenger. The structure of the cell 60 also supports a plurality of cantilever arms 30C which support the stationary ring 30A of a tail rotor 30, similar to that already described with reference to the embodiments illustrated above. The horizontal front and tail planes 40, 50, and the wing superstructure 20 all have an aerodynamic profile such as to generate a lift force during flight. In the event that the aircraft is designed for several passengers, the number of vertical axis rotors can be increased, for example, by adding one rotor per side. Similarly, the horizontal axis propellers can increase from one to two, while keeping the basic concepts of the project unchanged. As in all the previous cases, the orientation in direction (yaw) and the stability (pitch, roll) of the aircraft can be defined by varying the speed of the rotors with vertical axis or by a combination due to the rotors with vertical axis and with movable wings-flaps introduced either on the main wings or on the tail rotor.

Configurations of aircraft with full control in yaw, pitch and roll are possible using two or three or four or five or six ducted propeller rotors with vertical axis. If an annular motor with two counter-rotating rotors is used, control of the aircraft can be carried out with a single annular cavity wherein two counter-rotating annular propellers connected to the respective rotor bodies of the motor are inserted.

Preferably, the wing superstructure 20 is disc-shaped, in order to maximize both the area of the load-bearing surface and the angle of incidence at which detachment of the air from the wing surface occurs. Still preferably, the wing superstructure 20 and the lower wings 40, 50 are arranged to maximize the "safety" of the vehicle in a pendulum-canard configuration.

According to another preferred characteristic, the openings 5 within which the rotors 3 are arranged are covered by a grid that has the function of protecting users. In a preferred example, the grid is a thread-like grid with wires oriented in the direction of motion, having the object of guiding the air flow.

Figure 15A:
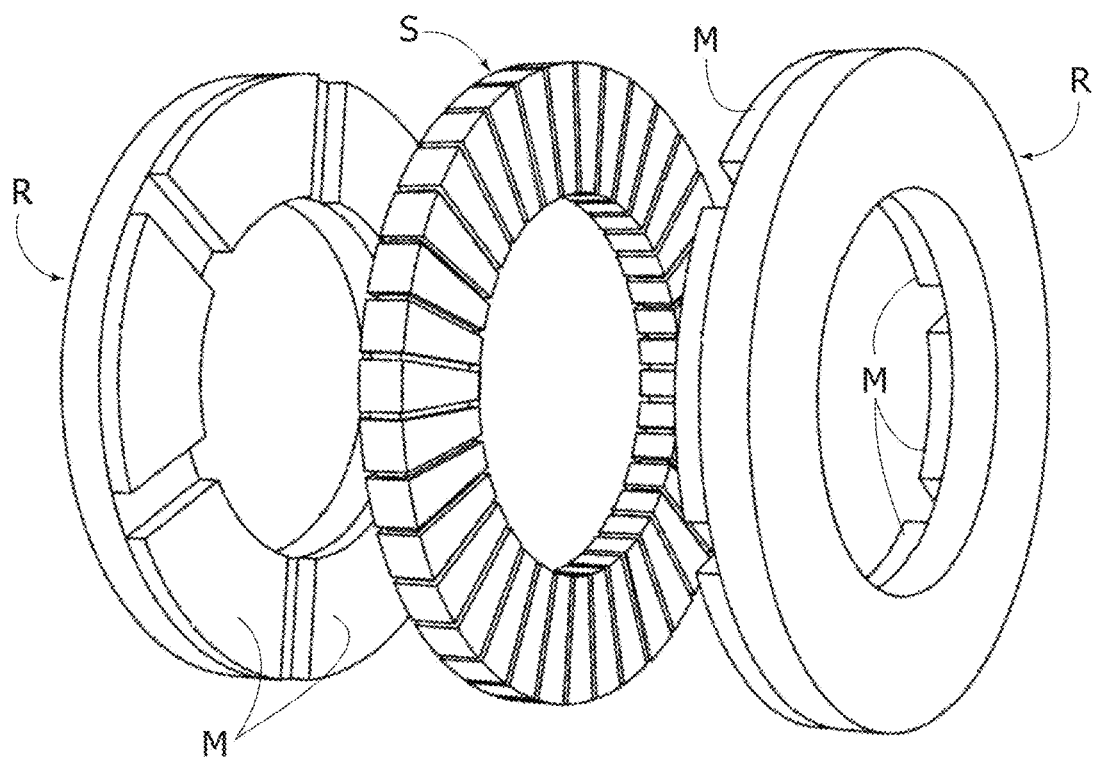
Figure 15B:
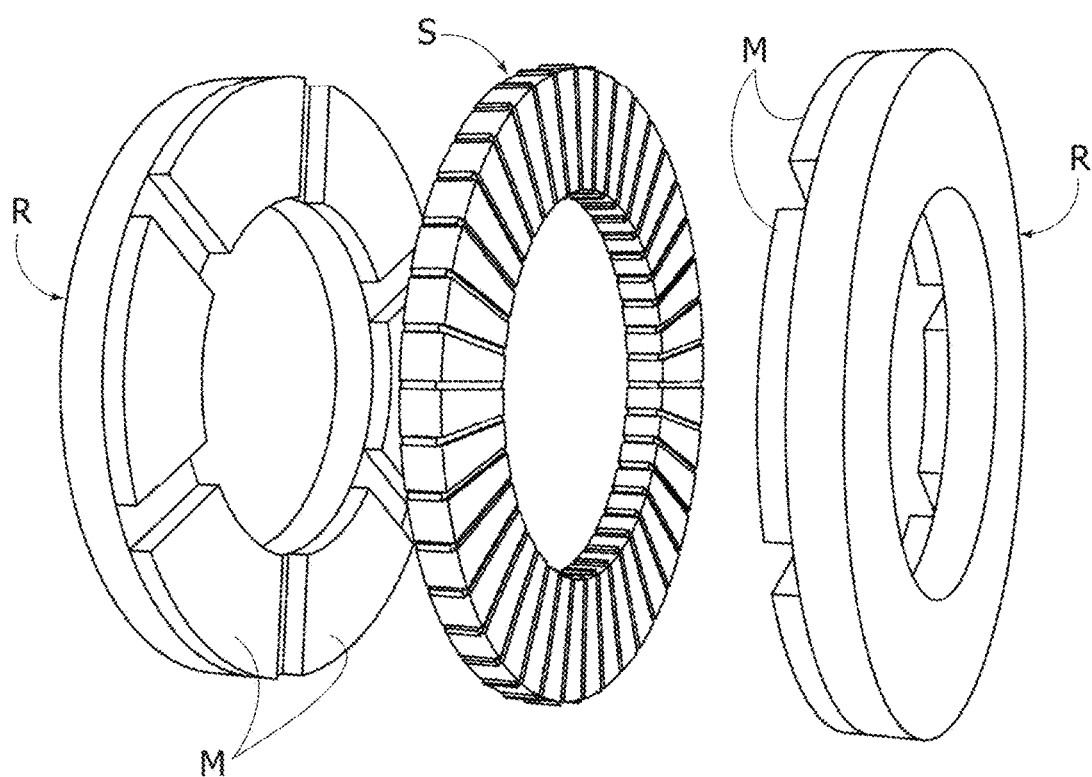
Figure 15C:
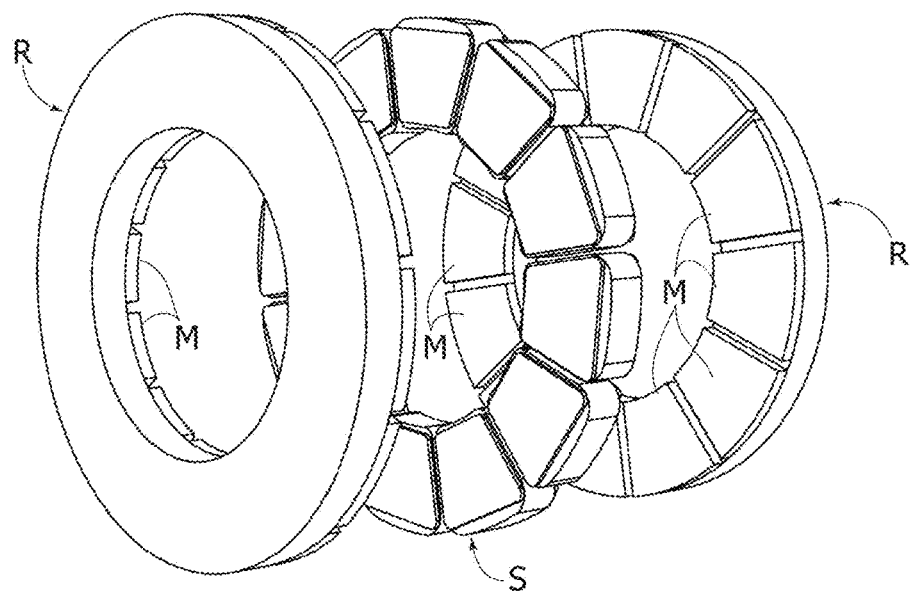
Figure 15D:
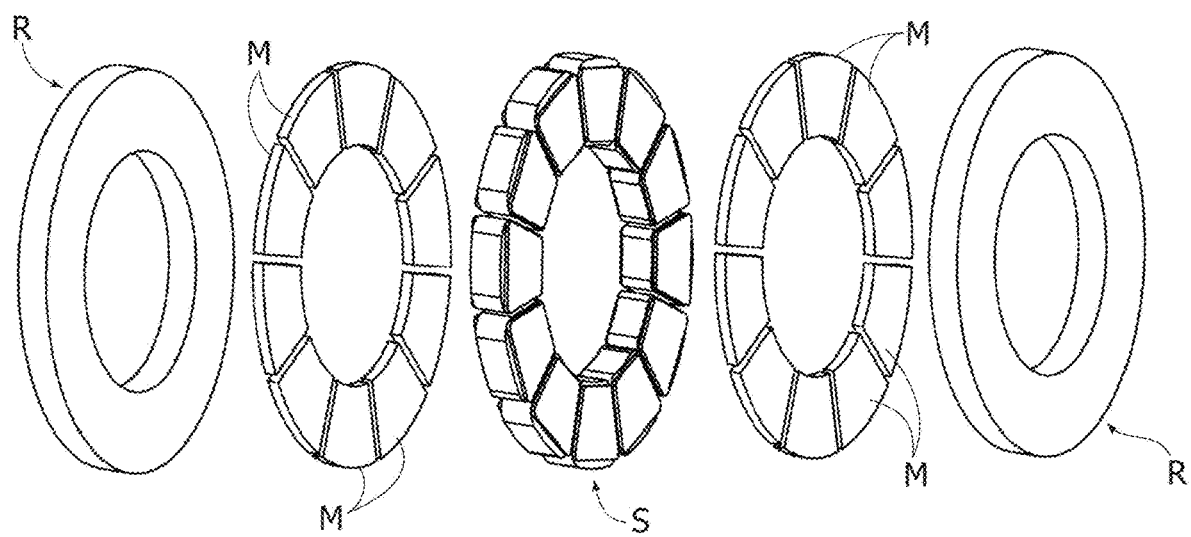
Figure 15E:
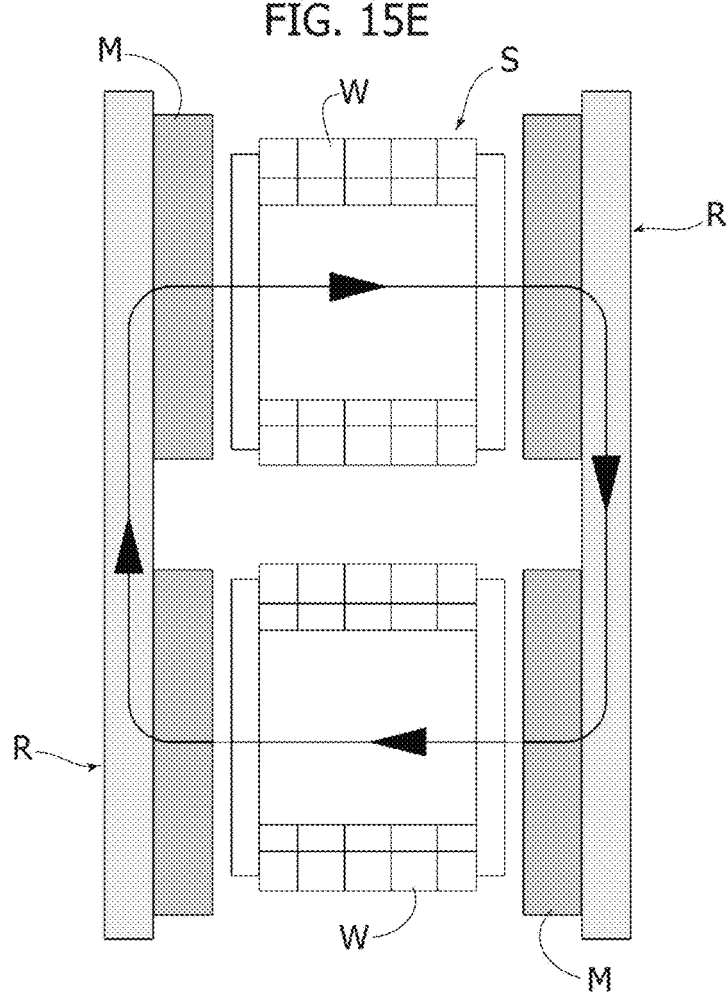

FIGS. 15A-15E schematically show some examples of axial flow annular electric motors, usable in the aircraft of the present invention, wherein a single stator disc S, carrying windings W, is interposed axially between two rotor discs R, carrying magnets M. FIG. 15E also shows the magnetic flux through stator and rotors. The magnets M are high efficiency magnets, for example, of the Neodymium-Iron-Boron type, with various percentages of Dysprosium. The magnets M are arranged on both sides of the rotor, and can be formed on the rotor itself with known production techniques, for example, by means of "screen printing" or printing of composite powders, or preferably, by gluing magnets.

Figure 16A:
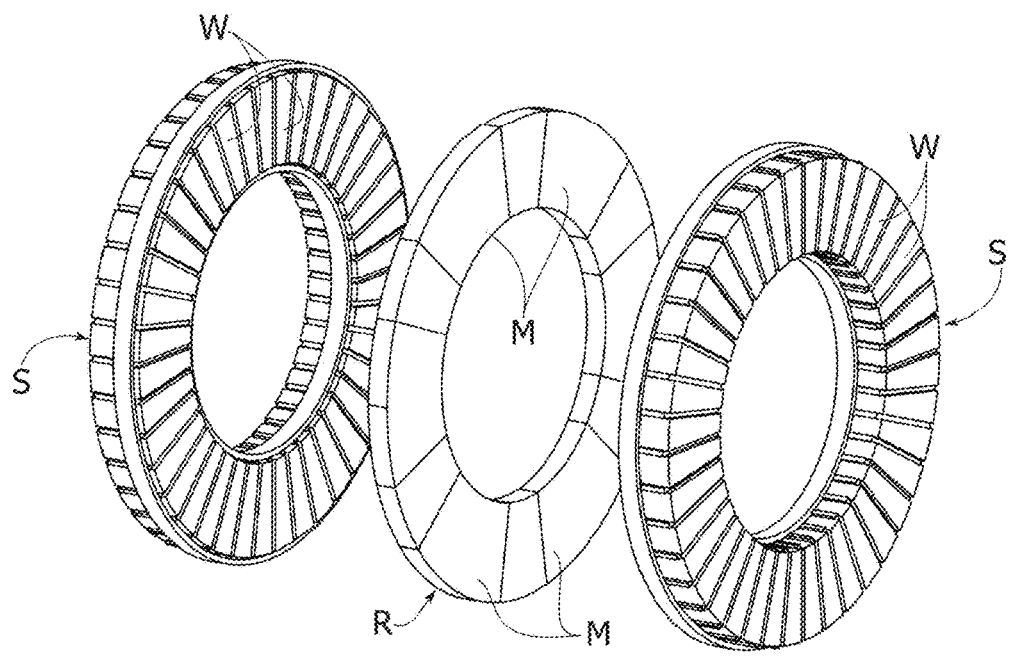
Figure 16B:
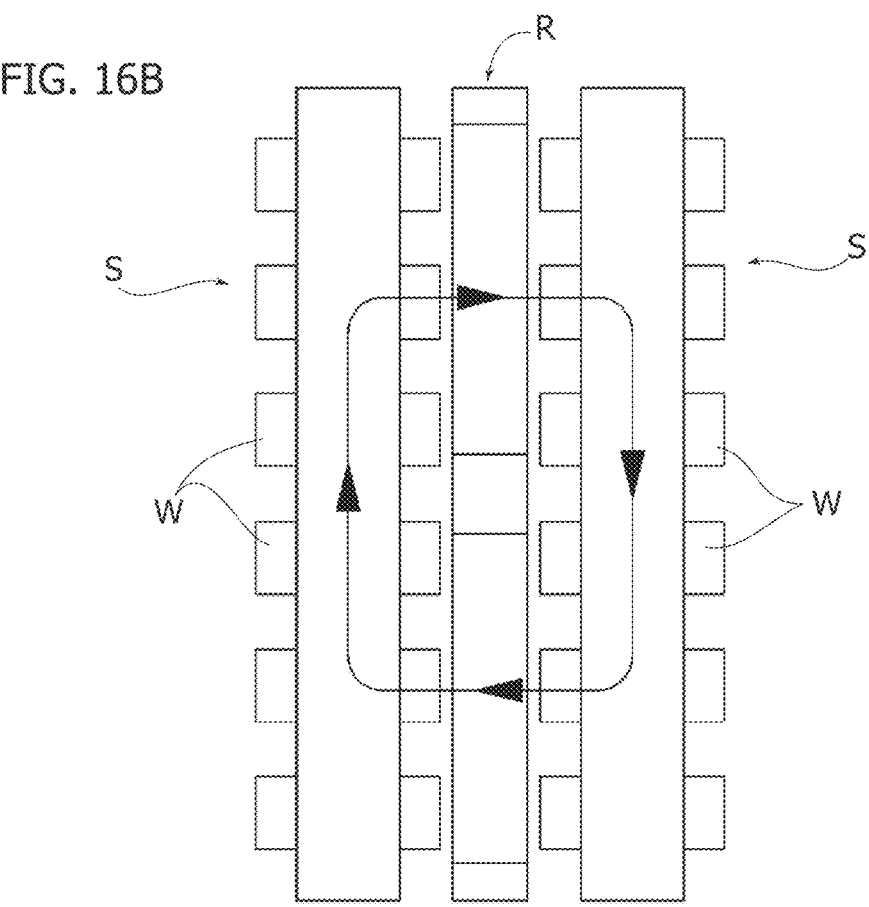

FIGS. 16A, 16B schematically show an example of an axial flow annular electric motor, usable in the aircraft of the present invention, wherein a single rotor disc R, carrying magnets M, is interposed axially between two stator discs, carrying windings W. In the preferred configuration, the two rotors rotate in the same direction. However, for this type of configuration, the two sides of the stator can be such as to cause rotation of the two rotors in the opposite direction. The stator is produced according to known techniques of printing electronics, via screen printing or by means of conventional wire windings.

Figure 17:
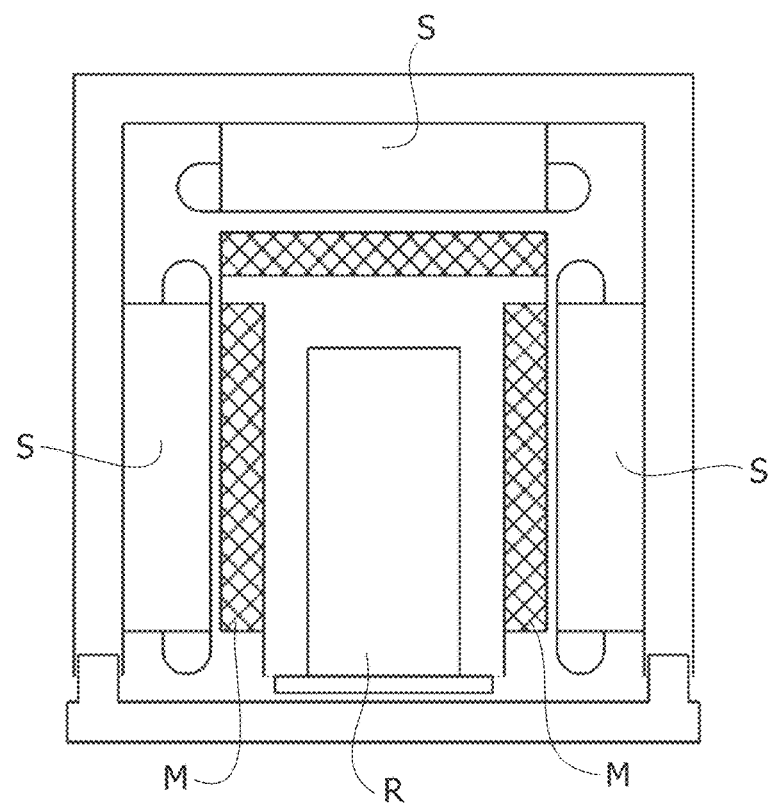
Figure 18:
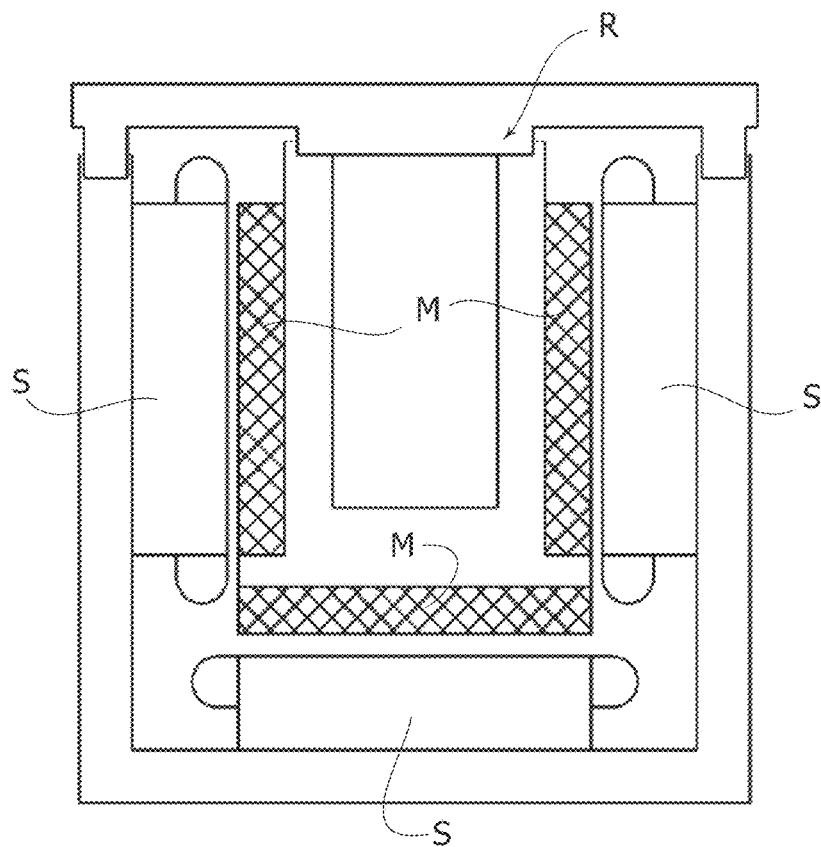

FIGS. 17 and 18 show two examples of annular electric motors with a single rotor disc R interposed axially between two stators S and coaxially arranged with respect to another stator S, which in the case of FIG. 17 is an outer stator, while in the case of the FIG. 18 is an inner stator. In both solutions, the three stators define two axial gaps and one radial gap with the rotor, so the motor operates with a mixed axial-radial flow.

Figure 19:
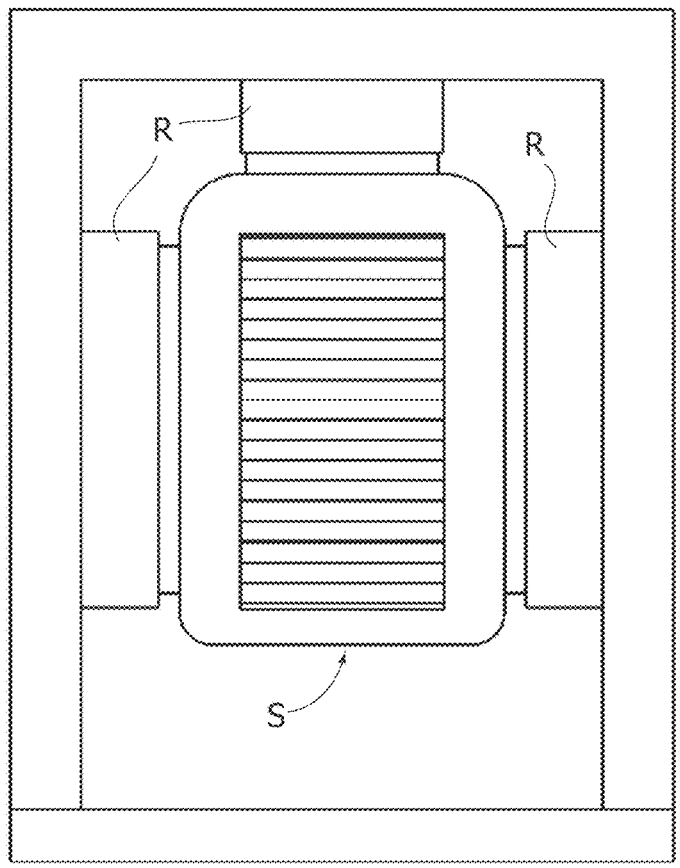
Figure 20:
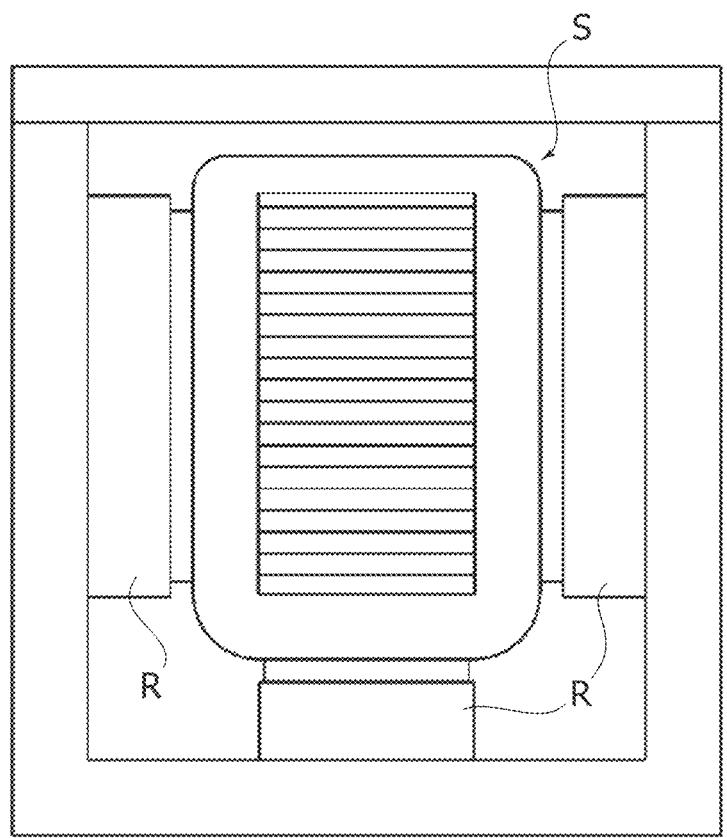

FIGS. 19, 20 schematically illustrate two further examples of an annular electric motor with axial-radial flow, comprising a single stator S surrounded by three rotors R.

Studies and investigations of the Applicant have shown that all annular electric motors of the type described here are able to operate with high efficiency, with a high torque/weight ratio, high speed rotation capacity and minimum energy consumption.

Although the examples illustrated in the drawings are all equipped with four vertical axis propeller rotors 3, the aircraft according to the invention may have any number of vertical axis rotors, for example, two or three or four or five or six vertical axis rotors. As already indicated, it is also possible to provide two overlapping and counter-rotating rotors, housed within the same circular opening of the aircraft structure.

In the present description, and in the claims that follow, the expression "axial flow annular electric motor", of course, also comprises the mixed axial-radial flow annular electric motors.

It should also be considered that the aircraft configurations illustrated in FIGS. 7-14 are also implementable with propeller rotors driven by annular electric motors of any type, including radial flow motors.

Furthermore, the expression "propeller rotors with vertical axis", of course, also comprises the case in which at least two of the rotors have their axis slightly inclined with respect to the vertical direction. For example, in FIG. 9 it is recognizable that the axes of the propeller rotors 3 with a vertical axis are slightly inclined with respect to the vertical direction and converging towards each other downwards, in order to favor the stability in roll and pitch of the aircraft.

Of course, without prejudice to the principle of the invention, the details of construction and the embodiments may vary widely with respect to those described and illustrated purely by way of example, without departing from the scope of the present invention.

The invention claimed is:

1. An aircraft, comprising:
at least one horizontal planar structure comprising a plurality of ducted propeller rotors with vertical axes, wherein each of the propeller rotors comprises a rotating ring rotatably mounted within a circular opening of the structure, the opening having an opening vertical axis through said at least one horizontal planar structure, said rotating ring defining an annular wall for ducting an air flow produced by each propeller rotor,
wherein the rotating ring further comprises a body and one or more blades which extend radially from the body towards a central axis of the propeller rotor and the one or more blades having tips terminating at a distance from the central axis of the propeller rotor, such that each propeller rotor is in a form of an annular propeller,
wherein the rotating ring of each propeller rotor is controlled in rotation by an electric actuator comprising an axial flow annular electric motor, and
each axial flow annual electric motor including:
two stator elements in a form of annular discs carried by said structure of the aircraft,
wherein a rotor element is axially interposed between the two stator elements and the rotor element is in a form of an annual disc connected to said rotating ring of the propeller rotor.

2. An aircraft, comprising:
at least one horizontal planar structure comprising a plurality of ducted propeller rotors with vertical axes, wherein each of the propeller rotors comprises a rotating ring rotatably mounted within a circular opening of the structure, the opening having an opening vertical axis through said at least one horizontal planar structure, said rotating ring defining an annular wall for ducting an air flow produced by each propeller rotor, wherein the rotating ring further comprises a body and one or more blades which extend radially from the body towards a central axis of the propeller rotor and the one or more blades having tips terminating at a distance from the central axis of the propeller rotor, such that each propeller rotor is in a form of an annular propeller, wherein the rotating ring of each propeller rotor is controlled in rotation by an electric actuator comprising an axial flow annular electric motor, and each axial flow annual electric motor including one stator element in a form of an annular disc carried by said structure of the aircraft, and axially interposed between two rotor elements in a form of annular discs, the two rotor elements connected to said rotating ring of the propeller rotor.

3. An aircraft according to claim 2, wherein the two rotor elements are connected to each other by a circumferential wall arranged concentrically inside the stator element.

4. An aircraft according to claim 3, wherein a cross-section of the annular disc defining the stator element has a T-shape on a radially inner side of said annular disc, so as to define two circumferential protrusions which are received within two corresponding circumferential cavities of the two rotor elements.

5. An aircraft according to claim 2, wherein said motor is configured and powered in such a way that the two rotor elements rotate in opposite direction.

6. An aircraft according to claim 2, wherein the openings within which the rotors are arranged are covered by a grid configured to protect users.

* * * * *